(12) United States Patent
Fisher

(10) Patent No.: US 9,694,690 B2
(45) Date of Patent: Jul. 4, 2017

(54) METHOD AND APPARATUS FOR GENERATION, TRANSMISSION AND STORAGE OF ELECTRIC ENERGY

(71) Applicant: Derek Barton Fisher, Buffalo, NY (US)

(72) Inventor: Derek Barton Fisher, Buffalo, NY (US)

(73) Assignee: Derek Barton Fisher, Buffalo, NY (US)

( * ) Notice: Subject to any disclaimer, the term of this patent is extended or adjusted under 35 U.S.C. 154(b) by 190 days.

(21) Appl. No.: 14/676,645

(22) Filed: Apr. 1, 2015

(65) Prior Publication Data

US 2016/0089984 A1    Mar. 31, 2016

Related U.S. Application Data

(60) Provisional application No. 62/056,561, filed on Sep. 28, 2014.

(51) Int. Cl.
| | |
|---|---|
| *B60L 11/00* | (2006.01) |
| *B60C 23/04* | (2006.01) |
| *H02N 11/00* | (2006.01) |
| *B60R 16/03* | (2006.01) |

(52) U.S. Cl.
CPC ........ *B60L 11/002* (2013.01); *B60C 23/0493* (2013.01); *B60L 2220/44* (2013.01); *B60L 2220/50* (2013.01); *B60R 16/03* (2013.01); *H02N 11/008* (2013.01); *Y02T 10/641* (2013.01); *Y02T 10/7077* (2013.01); *Y10S 74/09* (2013.01)

(58) Field of Classification Search
CPC ... B60R 16/0315; B60R 16/03; B60L 11/002; B60L 2220/44; B60L 2220/50; H02N 11/008; Y02T 10/641; Y10S 74/09
See application file for complete search history.

(56) References Cited

U.S. PATENT DOCUMENTS

| | | | | |
|---|---|---|---|---|
| 4,510,484 A | * | 4/1985 | Snyder | B60C 23/0411 340/438 |
| 6,255,940 B1 | * | 7/2001 | Phelan | B60C 23/0493 152/152.1 |

(Continued)

*Primary Examiner* — Michael Zarroli

(57) ABSTRACT

Comprising at least one device for providing mechanical/electrical energy conversion utilizing materials with linear electromechanical interaction properties, a device providing intermediate storage and, a device providing primary storage. Where the energy is transferred by inductive coupling of an inner hub coil and an outer hub coil between said storage devices. Energy conversion and storage is initiated by motion of said energy converter which places the system operational. Then, mechanical energy is converted into electrical energy which is delivered to the intermediate storage device. When the intermediate storage device is charged, energy is transferred to the outer hub coil for inductive transmission to the inner hub coil. From the inner hub, energy is immediately transferred to the primary storage until the system is required to provide power to an external device or system. Replacing or supplementing conventional sources of power, this system may also provide for collecting and transmitting data.

12 Claims, 6 Drawing Sheets

(56) References Cited

U.S. PATENT DOCUMENTS

| | | | | |
|---|---|---|---|---|
| 6,847,126 B2 * | 1/2005 | Adamson | ............... | B60C 11/00 |
| | | | | 152/152.1 |
| 7,023,100 B2 * | 4/2006 | Vlad | ....................... | H02N 2/18 |
| | | | | 152/152.1 |
| 7,047,800 B2 * | 5/2006 | Thiesen | ............. | B60C 23/0411 |
| | | | | 73/146 |
| 7,096,727 B2 * | 8/2006 | Adamson | ........... | B60C 23/0411 |
| | | | | 307/44 |
| 7,415,874 B2 * | 8/2008 | Mancosu | ........... | B60C 23/0411 |
| | | | | 310/339 |
| 7,687,943 B2 * | 3/2010 | Lunde | ................ | H02K 7/1846 |
| | | | | 290/1 R |
| 7,781,942 B2 * | 8/2010 | Hatano | ............. | B29D 30/0061 |
| | | | | 310/339 |
| 8,171,791 B2 * | 5/2012 | Sy | .......................... | B60T 8/171 |
| | | | | 73/488 |
| 9,344,011 B2 * | 5/2016 | Abou-Nasr | .......... | B60C 23/041 |
| 2010/0166567 A1 * | 7/2010 | Calley | .................... | F03D 7/047 |
| | | | | 416/241 R |

* cited by examiner

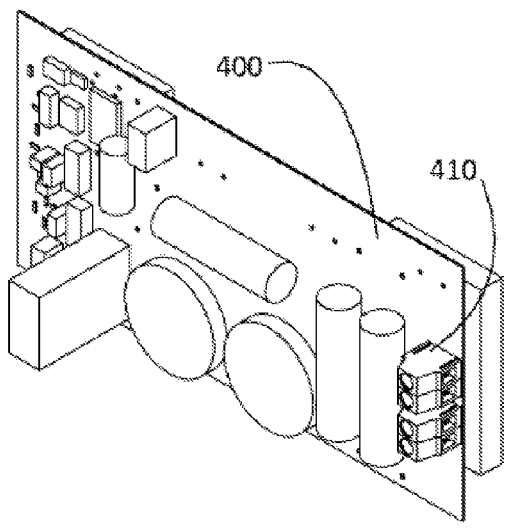 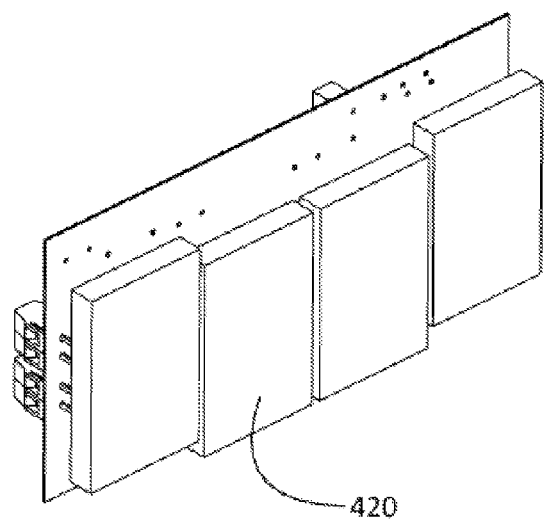
FIG. 4A                    FIG. 4B

METHOD AND APPARATUS FOR GENERATION, TRANSMISSION AND STORAGE OF ELECTRIC ENERGY

TECHNICAL FIELD

The present invention relates to field of power supplies and regulation systems. Specifically, the invention comprises a system that may replace or optionally supplement conventional sources of power.

BACKGROUND ART

Internal combustion engine technologies have evolved to enable long distant travel by efficiently utilizing fossil fuels to provide prolusion. Although combustion technology has been refined and improved immensely over the past century, the number of vehicles on the road introduce climate altering amounts of carbon monoxide to the atmosphere.

Alternative energy vehicles are beginning to present a challenge to their fossil fuel counterparts but they still face challenges in regard to their acceptance due to their lack of range in comparison to combustion engine powered vehicles.

Extending the range of electric vehicles is desirable, so that this technology will approach and perhaps exceed the capabilities of gas combustion engines, thus providing a viable alternative to them. Current approaches to the problem include utilizing faster chargers, regenerative breaking, increasing the number of onboard batteries, innovative battery technologies and increasing the number of charging stations. While these methods do enable additional range, they still fall short of the capabilities of gas engines.

Charging on the go is hence desirable, wherein extended range is possible without growing charging station infrastructure that not only would prove costly but would also in and of itself add to the environmental footprint of Alternative energy vehicles. The ability to harness an onboard energy source that has gone previously untapped will not only increase the overall efficiency of the vehicle but will also reduce travel time.

SUMMARY OF THE INVENTION

An object of this invention is, but not limited to, overcoming at least some of the limitations relating to the current alternative energy vehicle designs of prior art devices as discussed above.

Hence, in a first aspect there is a system to provide a regenerative power supply, the system comprising the steps of: converting mechanical energy into electrical energy by piezoelectric method, having provided said energy conversion, converted energy is transferred to a type of implement providing intermediate storage, a type of implement providing primary storage by means of inductive coupling between said storage devices.

The system is activated by the motion of the energy converter. In the active state the system charges the intermediate storage device. Once the intermediate storage device is sufficiently charged, energy is transferred to the outer hub for inductive transmission of electric energy to the inner hub. From the inner hub, the energy is transferred to the primary storage device where it remains until the system is required to provide power to internal or external systems or devices.

In addition to replacing or supplementing conventional sources of power, said system may also provide a means to collect and transmit system and environmental data.

In other words, the system may be utilized to quantify environmental conditions including but not limited to road characteristics and real time weather conditions. With little modification, the system may provide data regarding passenger and cargo characteristics and determine tire state. Such information, although typically very useful, is not essential for the invention at hand.

In summary, a power source is achieved that provides energy harvested from a previously wasted resource. This is advantageous in a number of ways in that this invention provides supplemental clean energy efficiently with minimal human intervention, minimal additional mechanical equipment requiring maintenance and may be adapted to other systems and devices that possess some type of motion.

In other aspects, the invention provides a method having features and advantages corresponding to those discussed above.

BRIEF DESCRIPTION OF THE DRAWINGS

Figure 1:
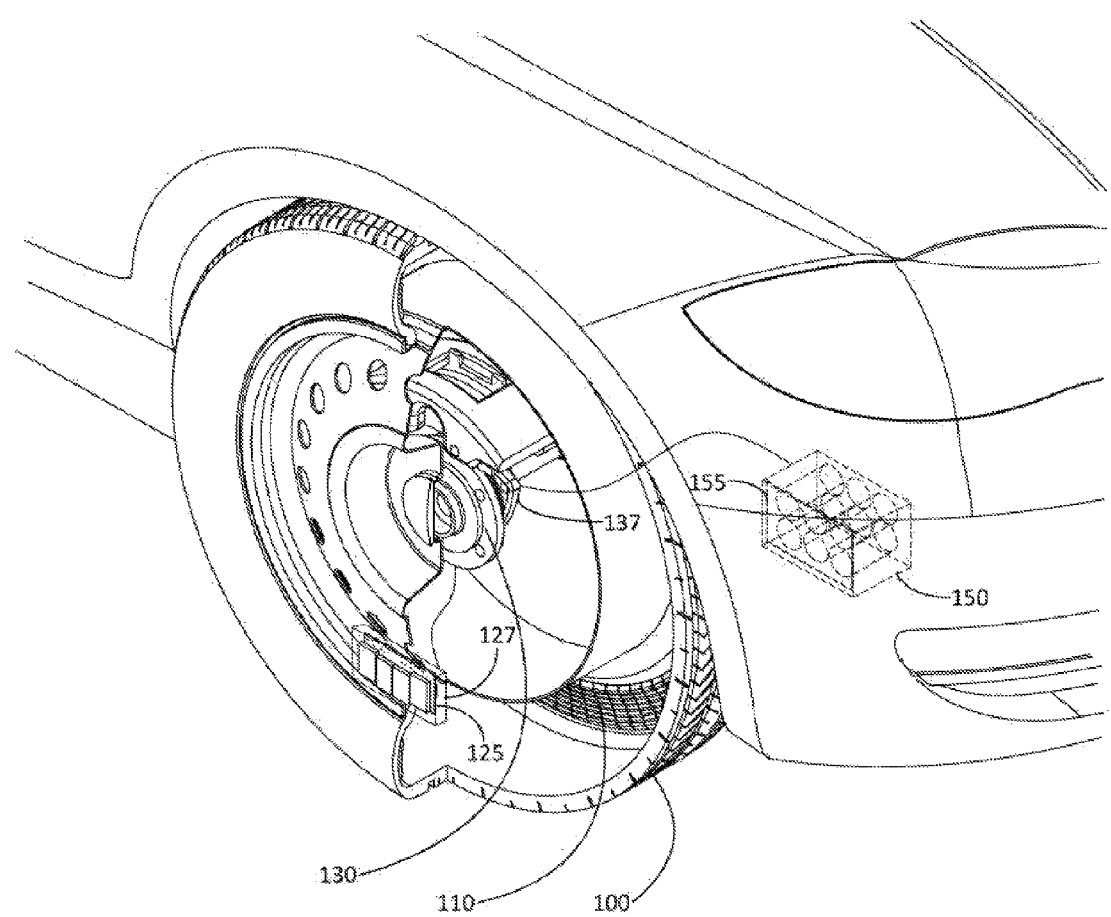

Having thus described the invention in general terms, reference will now be made to the accompanying drawings, which are not necessarily drawn to scale, and wherein:

FIG. 1 illustrates the harmonic system within the context of a motor vehicle according to one embodiment of the present invention.

Figure 2:
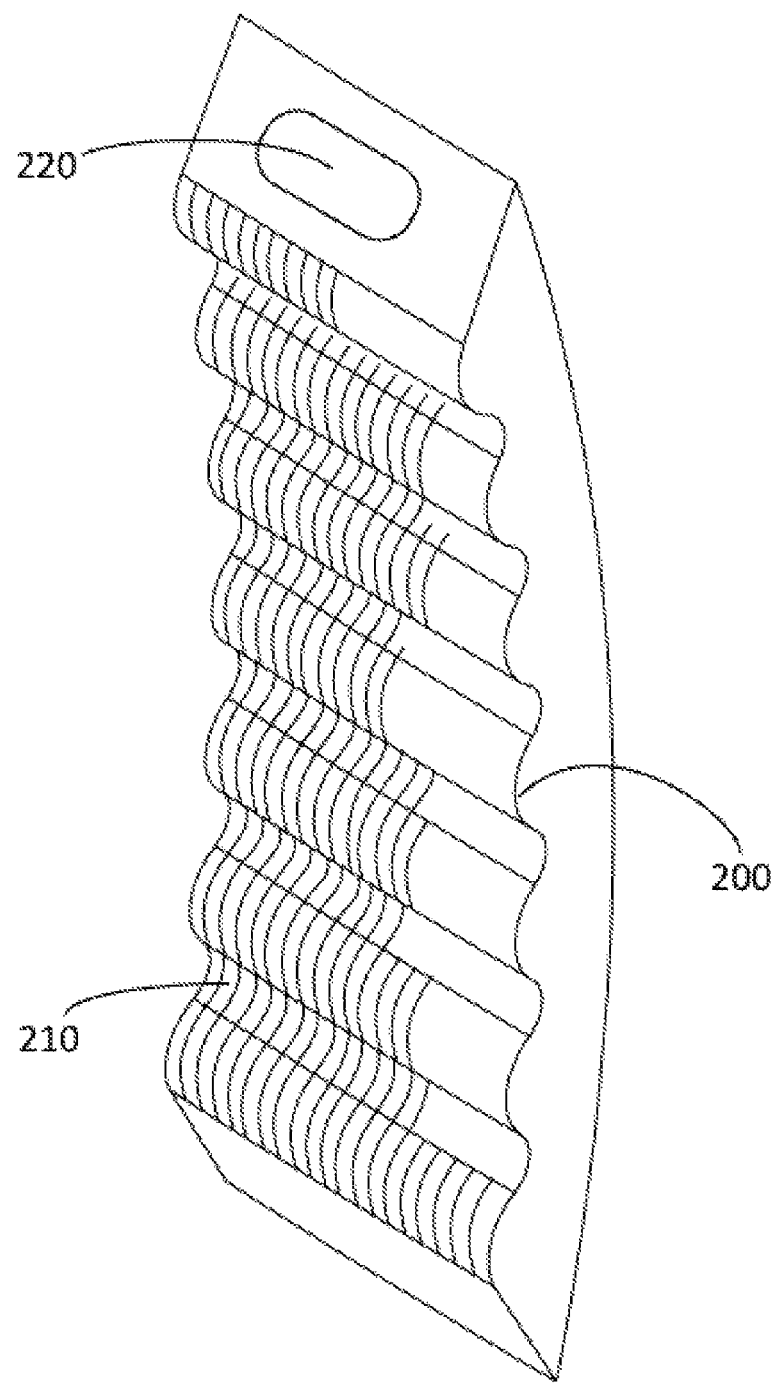

FIG. 2 shows a detail of the energy converting device according to one embodiment of the present invention.

Figure 3:
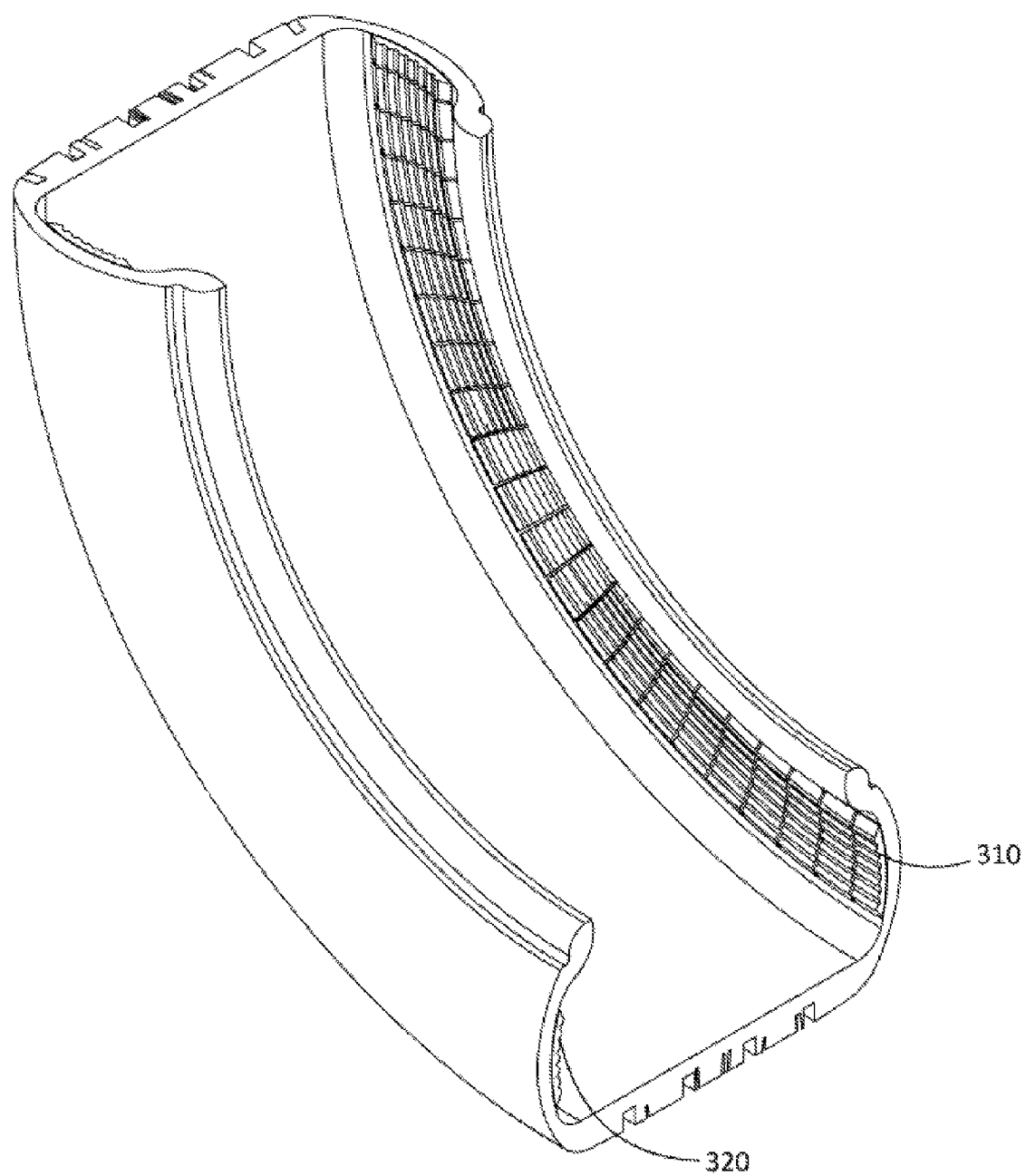

FIG. 3 shows a detailed view of the energy converting device within the context of a tire according to one embodiment of the present invention.

FIG. 4A & FIG. 4B shows opposing views of the temporary storage device according to one embodiment of the present invention.

Figures 5A, 5B:
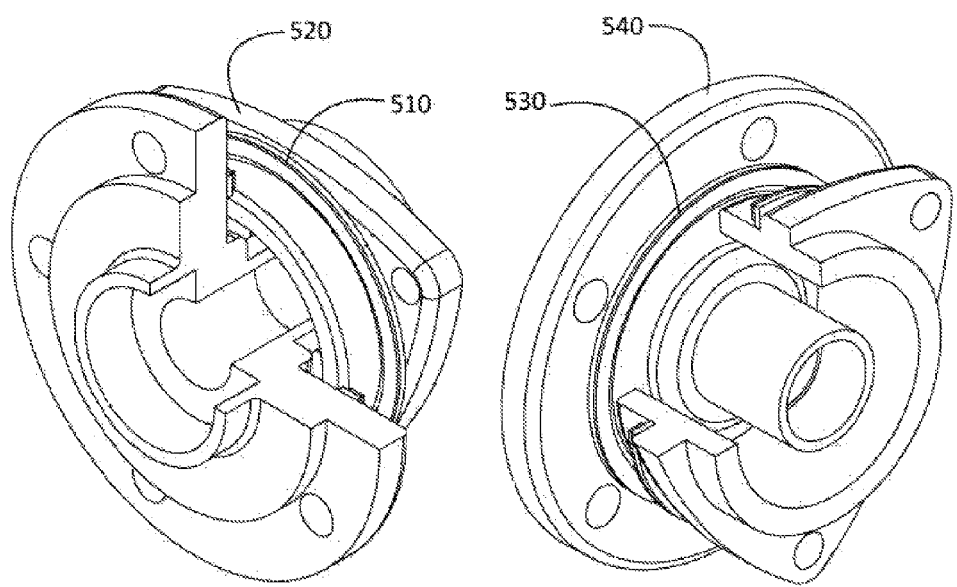

FIGS. 5A and 5B illustrate opposing cutaway views of the inner and outer hubs according to one embodiment of the present invention.

Figures 6A, 6B:
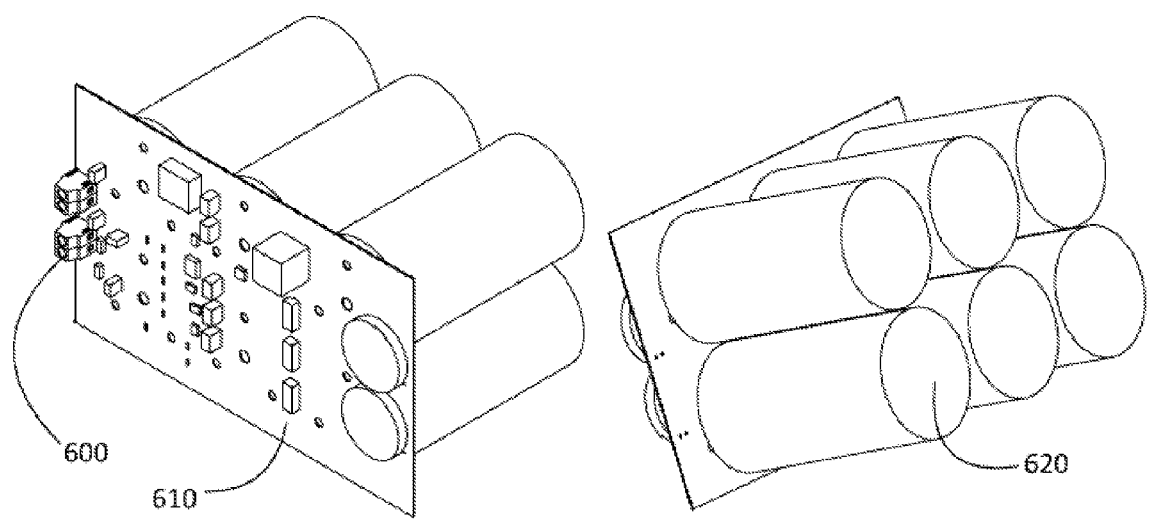

FIG. 6A and FIG. 6B illustrate opposing views of the primary storage device according to one embodiment of the present invention.

DESCRIPTION OF THE EMBODIMENTS

The present inventions will now be described more fully hereinafter with reference to accompanying drawings, in which some examples of the embodiments of the inventions are shown. Indeed, these inventions may be embodied in many different forms and should not be construed as limited to the embodiments set forth herein; rather, these embodiments are provided by way of example so that this disclosure will satisfy applicable legal requirements. Like numbers refer to like elements throughout.

Reference is now made to FIG. 1 which illustrates a regenerative power supply constructed and operative in accordance with the preferred embodiment of the present invention. The power supply comprises energy converter element(s) capable of converting mechanical energy to electrical energy by piezoelectric method (110) which is integrated into the tire (100), intermediate energy storage device (125) protected by its sealed housing (127), primary energy storage device (155) shown within its enclosure (150), outer hub (130) and inner hub (137), wherein there exists means to transfer electrical energy between said converter and said intermediate storage via electrically conductive material connector(s), means to transfer electrical energy between said intermediate storage and said outer hub via electrically conductive material connector(s), means to transfer electric energy by inductive coupling between said outer (530) and inner (510) hub coils by exposing the inner hub coil to the magnetic field of the outer hub coil, thus inducing a voltage across the inner hub coil and means to transfer of electrical energy between said inner hub said primary storage device via electrically conductive material connector(s).

Turning now to FIG. 2 the charge accumulates in the converter stacks (210) in response to applied mechanical stress. This is attributed to the linear electromechanical interaction between the mechanical and the electrical state in crystalline materials. Waveform features of the converter provide a means to fine-tune the amount mechanical stress imposed upon the converter stacks. Electronics embedded within the converter (200) provide rectification of converted energy. In the current embodiment of the present invention, energy conversion and rectification occurs when the vehicle and hence the wheel and tire are in motion.

In accordance with the current embodiment of the present invention multiple converters are shown encompassing the sidewalls of tire (310, 320) but a single converter does not need to be coupled with other converters to produce a useful amount of electrical energy. In addition, converters of other embodiments may utilize other tire locations, such as the inner tread.

FIGS. 4A and 4B illustrates opposing sides of an intermediate energy storage device constructed to provide temporary warehousing for energy produced by the energy converter. Energy received via electrically conductive material connector(s) (410) is processed and delivered to high capacity energy storage containers (420) capable of enduring a significant number of power cycles. Power and control circuitry for the energy harvesting and storage container charging is contained within the intermediate storage device circuit board (400).

In accordance with a preferred embodiment of the present invention, when the vehicle and hence the tire and converters are not in motion, energy conversion does not take place. The Intermediate storage device is initially in the OFF state. The intermediate storage device must receive a sustained signal from the energy converter(s), before the device becomes active and the system enters an ON state.

When the system enters the ON state, the intermediate storage device storage circuit is powered and the circuit determines the charge state of the storage devices. If the system determines the energy storage containers are not fully charged, a voltage is applied across them.

If the intermediate storage device storage containers voltage is measured to be above their charge limit, the gate is clamped and the intermediate storage device storage containers are discharged through the outer hub coil.

When the intermediate storage device storage containers voltage drops below their lower limit, the system returns the containers to their charge state.

With the intermediate storage device storage containers in the discharge state, a high frequency oscillating signal is provided to the outer hub coil. Referring now to FIGS. 5A and 5B is shown opposing views of sub-assembled inner (520) and outer (540) hubs. In accordance with a preferred embodiment of the present invention, outer hub coil (510) and inner hub coil (530) provide a pathway for near field wireless transmission of electrical energy.

The outer hub coil will, when supplied by the intermediate storage device will ring with the oscillating current, generating an oscillating magnetic field. The inner hub coil picks up most of the energy supplied by the outer hub coil. In addition to supplying energy for direct storage, information may be transferred via the outer and inner hubs. This information may be of analog and digital formats and may be useful in determining static and dynamic information relating to tire, wheels, vehicle and environment. Such information, although typically very useful, is not essential for the invention at hand.

Primary storage device of FIG. 6 consists of power and control circuitry (610) and storage containers (620) similar to the intermediate storage containers of FIG. 4. These storage containers provide useable on demand power to vehicle systems for the current embodiment of the present invention. Similar to the intermediate storage device and outer hub coil, the primary storage device (600) receives electrical energy via electrically conductive material connector(s) from the inner hub coil.

It will be appreciated by persons skilled in the art that the present invention is not limited by what has been particularly shown as described hereinabove. Rather the scope of the present invention is defined only by accompanying claims.

The invention claimed is:

1. An automotive based apparatus for generation, transmission and storage of a regenerative electrical energy source comprised:
  (a) at least one material element capable of converting mechanical energy to electrical energy by piezoelectric method,
  (b) intermediate energy storage device,
  (c) primary energy storage device,
  (d) outer hub coil,
  (e) inner hub coil wherein there exists,
    forming an electric circuit comprised of at least one energy converter element,
    transferring electrical energy from said energy converter element(s) circuit to said intermediate storage device via electrically conductive material connector(s),
    transferring electric energy from said intermediate storage to said outer hub coil via electrically conductive material connector(s),
    inductively coupling said outer and inner hub coils by exposing the inner hub coil to the magnetic field created by the outer hub coil, thus inducing a voltage across the inner hub coil and,
    delivery of electrical energy between said inner hub coil and said primary energy storage device via electrically conductive material connector(s).

2. The renewable electrical energy source of claim 1 wherein said energy converter is comprised of at least one electronic component and one piezoelectric material element possessing linear electromechanical interaction properties.

3. The renewable electrical energy source of claim 1 wherein said intermediate storage is comprised of at least one electronic component and at least one electrical energy storage container.

4. The renewable electrical energy source of claim 1 wherein said outer hub coil is comprised of at least one loop of an electrically conductive material.

5. The renewable electrical energy source of claim 1 wherein said inner hub coil is comprised of at least one loop of an electrically conductive material.

6. The renewable electrical energy source of claim 1 wherein said primary energy storage device is composed of at least one electronic circuit and at least one electrical energy storage container.

7. The renewable electrical energy source of claim 1 wherein said system may be the primary energy source for automotive systems.

8. The renewable electrical energy source of claim 1 wherein said system may provide a supplemental source of energy for automotive systems.

9. The renewable electrical energy source of claim 1 wherein said system may provide a primary source of energy for non-automotive systems that experience motion.

10. The renewable electrical energy source of claim 1 wherein said system may provide a supplemental source of energy for non-automotive systems that experience motion.

11. The renewable electrical energy source of claim 1 wherein said system collects and stores energy in relation to human intervention interaction.

12. The renewable electrical energy source of claim 1 wherein said system provides means to generate data regarding tire inflation levels, tire angular velocity, road geography, vehicle and passenger weight, sidewall stiffness and tire to contacting surface impact.

* * * * *